United States Patent [19]
Beriger

[11] 3,867,484
[45] Feb. 18, 1975

[54] S,S-BIS-BENZYL ALKYLPHOSPHONATES

[75] Inventor: Ernst Beriger, Neu-Allschwil, Switzerland

[73] Assignee: Ciba-Geigy A.G., Basel, Switzerland

[22] Filed: Apr. 1, 1970

[21] Appl. No.: 24,855

[30] Foreign Application Priority Data
Apr. 2, 1969 Switzerland.......................... 5107/69

[52] U.S. Cl. .............. 260/961, 260/543 P, 260/940, 260/954, 260/955, 424/210, 424/218, 424/22
[51] Int. Cl. ........................... C07f 9/40, A01n 9/36
[58] Field of Search ..................................... 260/961

[56] References Cited
UNITED STATES PATENTS
3,094,405 6/1963 Toy et al......................... 260/961 X
3,185,721 5/1965 Schrader......................... 260/961 X FOREIGN PATENTS OR APPLICATIONS
27,353 11/1968 Japan................................ 260/961

Primary Examiner—Anton H. Sutto
Attorney, Agent, or Firm—Frederick H. Rabin; Philip P. Berestecki; Harry Goldsmith

[57] ABSTRACT

S,S-bis-benzyl-alkylphosphonates and S,S-bis-benzyl-alkylthiophosphonates, each of them optionally unsubstituted or substituted in the aromatic nucleus of the benzyl group, are effective fungicidal agents, preferably for combatting plant-pathogenic fungi. They may be used in fungicidal preparations.

2 Claims, No Drawings

S,S-BIS-BENZYL ALKYLPHOSPHONATES

This invention relates to phosphonic acid esters, a process for their preparation and fungicidal preparations containing them.

The present invention provides compounds of the general formula

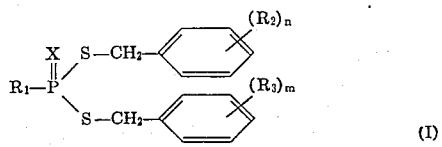

(I)

in which X represents an oxygen atom or a sulphur atom, $R_1$ represents an unsubstituted or substituted lower alkyl or aralkyl group, $R_2$ and $R_3$, which may be the same or different, each represents a hydrogen atom, a lower alkyl group, a nitro group, a trifluoromethyl group, a cyano group, or a halogen atom and $m$ and $n$, which may be the same or different, each is 1 or 2.

$R_1$ preferably represents a lower alkyl group and X preferably represents an oxygen atom.

The present invention also provides a process for the preparation of the compounds of the general formula I, which comprises reacting 1 mole of an alkane-(thio)-phosphonic acid dihalide of the formula

in which $R_1$ and X have the meanings specified above and hal represents a chlorine atom or a bromine atom, with either 2 moles of a benzylmercaptan of the general formula

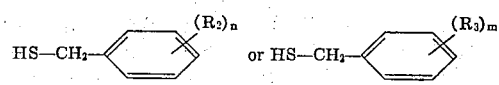

in which $R_2$, $R_3$, $n$ and $m$ have the meanings specified above, or if the final product is to be a phosphonic acid ester with dissimilarly substituted benzyl residues, with 1 mole of one of the above-specified benzylmercaptans and then with 1 mole of the other above-specified benzylmercaptans, in the presence of an acid acceptor.

Suitable acid acceptors are, for example, triethylamine, alkali metal carbonates, hydroxides and alcoholates. The exothermic reaction is preferably carried out while slightly cooling the mixture.

The compounds of the present invention have a very good activity against the class Phycomycetes, for example, phytopathogenic fungi, for example Botrytis and Piricularia, and also against various other phytopathogenic fungi that attack grain crops, corn, rice, vegetables, horticultural and other cultures.

The compounds of the present invention are especially active against the following types of fungi:

*Cochliobolus miyabeanus* species, *Corticium* species, *Cerospora* species, *Alternaria* species, *Venturia inaequalis*, *Podosphaera Leucotricha*, *Uromyces phaseoli*, *Cercospora apii*, *Cercospora beticula*, *Cercospora musae*, *Piricularia sp.*, *Erysiphe cichoracearum*, *Penicillium digitatum*, *Sphaerotheca humuli*, *Diplocarpon rosae*, *Uncinula necator*, *Coccomyces hiemalis*, *Cladosporium carpophilum*, *Erysiphe graminis hordei*, *Monolinia (Sclerotinia) Laxa*, *Monolinia (Sclerotinia) fructicola*, *Piricularia oryzae*, *Puccinia recondita*, *P. coronata*, *P. glumarum*, *Puccinia graminis tritici*, *Aspergillus niger*, *Aspergillus terreus*, *Rhizoctonia*, *Fusarium*, *Verticillium*, but this list does not claim to be complete.

The compounds of the present invention, as well as preparations containing them, also display toxic activity against fungi that attack plants in the soil and some of which cause Tracheomycoses, such as *Fusarium cubense*, *Fusarium dianthi*, *Verticillium alboatrum* and *Phialophora cinerecens*.

The present invention also provides fungicidal preparations which comprise, as active ingredient, at least one compound of the general formula I, if desired, together with a solvent, diluent, dispersant, emulsifier, adhesive, thickener, fertilizer or pesticide, or a mixture of any two or more of said substances.

Preparations that contain the active substances of the formula I may be applied in the most diverse forms, for example in the form of aqueous sprays, dusting powders or the like.

Aqueous sprays can be prepared, for example, on the basis of an emulsifiable concentrate or wettable powder. A suitable emulsifiable concentrate can be manufactured, for example, from about 25 parts of a compound of the general formula (I), from 40 to 50 parts of diacetone alcohol or isophorone, from 20 to 30 parts of an aromatic petroleum product, xylene, toluene or a mixture of such solvents, and from 2 to 10 parts of one or more emulsifiers. It is also possible to incorporate a small quantity of an agent that promotes the formation of a homogeneous solution, for example, methanol, methoxymethanol or butoxymethanol.

A suitable emulsifier may consist, for example, of from 1 to 1.5 parts of calcium or sodium dodecylbenzenesulphonate, from 2.5 to 4 parts of an octyl- or nonyl-phenoxy-polyethoxyethanol and from about 0.5 to 1 part of methanol and up to 0.8 part of xylene. The resulting mixture is added to the solvents and the active substance of the formula I in the ratio indicated above. It is also possible to use one or more other surfactants. Any type of surfactant as may be desired or advantageous may be used, for example, an anionic or cationic or nonionic product, which is soluble in solvents, to act as emulsifier. Instead of the above-mentioned non-ionic product derived from an alkylphenol and ethylene oxide there may be used, for example, ethylene oxide condensates of long-chain alcohols, carboxylic acids, phenols or amines. Compounds of this type are commercially available. Non-ionic condensates of polyglycerins and a resin-forming acid, for example, phthalic acid, may also be used in the manufacture of self-emulsifying preparations. Typical anionic emulsifiers are those based on alcohol sulphonates, sulphates or sulphosuccinates. Cationic surfactants soluble in solvents are, for example, oleyl benzyl dimethyl ammonium chloride and dodecyl benzyl trimethylammonium chloride or bromide. The character of the emulsifier in the individual case is not especially important, so long as it is soluble in a solution of the active substance in one or more inert organic solvents.

A wettable powder can be prepared by taking up an active substance of the general formula I in a volatile solvent, for example, acetone, and mixing in a finely divided solid, for example, kaolin, pyrophyllite or diatomaceous earth while evaporating the solvent. The powder is heated with a small proportion of one or more wetting-dispersing agents. A suitable formulation consists, for example, of 20 parts of an active substance of the formula I, 77.5 parts of one or more finely divided solids, 0.5 part of wetting agent, for example, an octylphenoxy-polyethoxyethanol, and 2 parts of the sodium salt of methylene-bis-naphthalene-disulphonic acid.

Dusting agents containing from 5 to 10 percent of the active ingredient can be prepared by diluting such a wettable powder with a finely divided solid carrier. If desired, the wetting agent may be omitted. If desired, the dispersant can also be omitted or replaced by a different one.

Each of the fungicidal preparations described above contains, in general, a carrier and, in most cases, a surfactant.

The fungicidal preparations of the present invention may be used by themselves or in admixture with other fungicidally active substances, among which may be mentioned, for example, the following:

Copper compounds, for example,
copper-I-oxide (cuprous oxide),
Bordeaux mixture,
copper-II-sulphate pentahydrate (copper sulphate),
basic copper-II-chloride (copper oxychloride),
copper-II-phosphate,
tribasic copper-II-sulphate,
basic copper-II-carbonate,
copper-II-dihydrazine sulphate,
copper-amine complexes,
copper-II-sulphate+ammonium carbonate mixture,
copper-II-chloride+basic copper-II-sulphate mixture,
basic copper-II-carbonate+zinc salt mixture,
copper-II-zinc chromatic complex (copper zinc chromate),
copper-II-zinc cadmium-calcium chromate complex,
copper-II-salt of oleic acid (copper oleate),
copper-II-salts of fatty acids,
copper-II-salt of naphthenic acid (copper naphthenate),
copper-II-salt of 8-hydroxyquinoline (oxine copper),
copper-II-salt of 1,2-naphthoquinoxime-(2),
copper-II-salt of 3-phenylsalicylate;
tin and mercury compounds, for example,
bis-(tri-n-butyl-tin)oxide,
triphenyl-tin hydroxide (fentin hydroxide),
triphenyl-tin acetate (fentin acetate),
bis-(tributyl-tin)succinate,
mercury-I-chloride (calomel),
mercury-II-chloride (mercuric chloride),
mercury-II-oxide,
mercury-zinc chromate complex,
mercury-II-lactate,
ethylmercuric chloride,
2-hydroxyethyl-mercuric acetate,
ethylmercuric isothiocyanate,
3-ethoxypropyl mercuric bromide,
chloromethoxypropyl mercuric acetate,
methoxyethylmercuric chloride,
2-methoxyethylmercuric silicate,
bis-(methylmercuric)sulphate,
bis-(methylmercuric)ammonium acetate,
ethylmercuric acetate,
2-methoxyethylmercuric acetate,
ethylmercuric phosphate,
isopropylmethylmercuric acetate,
methylmercuric cyanide,
methylmercuric benzoate,
N-cyano-N'-(methylmercuric)guanidine,
methylmercuric pentachlorophenolate,
ethylmercuric-2,3-dihydroxypropylmercaptide,
methylmercuric-8-hydroxyquinolate (Ortho LM),
N-(methylmercuric)-1,4,5,6,7,7-hexachlorobicyclo-[2.2.1]-hept-5-ene-2,3,-dicarboximide,
N-(ethylmercuric)-1,4,5,6,7,7-hexachlorobicyclo-[2.2.1]-hept-5-ene-2,3-dicarboximide,
sodium salt of ethylmercuric thiosalicylate,
N-(ethylmercuric)-para-toluenesulphonic acid anilide,
phenylmercuric acetate (PAM),
phenylmercuric propionate,
phenylmercuric triethanol ammonium lactate (PAS),
phenylmercuric urea,
N-(phenylmercuric)-1,4,5,6,7,7-hexachlorobicyclo-[2.2.1]-hept-5-ene-2,3-dicarboximide,
phenylmercuric dimethyl dithiocarbamate,
phenylmercuric formamide,
phenylmercuric chloride,
phenylmercuric acetate, benzoate, borate, hydroxide, iodide,
basic phenylmercuric nitrate,
phenylmercuric monoethanolamine lactate,
phenylmercuric salicylate,
hydroxymercuric chlorophenol, trichlorophenol, nitrophenol,
N-phenylmercuric ethylenediamine,
phenylmercuric monoethanolammonium acetate,
pyridylmercuric acetate,
diphenylmercuric-8-hydroxyquinolate,
mercuric-(II)-complex with organic phosphates,
mixture of methylmercuric-2,3-dihydroxypropylmercaptide and methylmercuric acetate,
mixture of ethylmercuric-2,3-dihydroxypropylmercaptide and ethylmercuric acetate,
mixture of hydroxymercuric chlorophenol and hydroxymercuric nitrophenol,
mercury-cadmium organic complex;
further inorganic compounds, for example,
elemental sulphur,
ammonium polysulphide,
sodium polysulphide,
barium polysulphide,
calcium polysulphide and calcium thiosulphate (lime sulphur),
calcium hypochlorite,
boric acid,
sodium tetraborate decahydrate (borax),
zinc chloride,
magnesium borate,
nickel sulphate,
potassium chromate,
lead arsenate,
cadmium chloride,
cadmium carbonate,
further organo-metal compounds, for example,
cadmium succinate,
cadmium-di-n-propyl-xanthate,
cadmium-8-hydroxyquinolate,
phenylamino-cadmium acetate,
phenylamino-cadmium dilactate,
methyl arsine sulphide, zinc, octate, oleate;
simple aliphatic organic compounds, for example,
formaldehyde, paraformaldehyde,
acrolein,
methylbromide,
methyl isothiocyanate,
tetraiodoethylene,
1,3-dichloropropene and related chlorinated $C_3$-hydrocarbons,
1-chloro-3-bromopene(1),
trans-1,4-dibromobutene(2),
1,3-dichloropropene(1),
1-chloro-2-nitropropane,
2-chloro-1-nitropropane,
trichloronitromethane,
dichloro tetrafluoro acetone,
sodium salt of propionic acid,
calcium salt of propionic acid,
chlorofumaric acid-bis-$\beta$-chloroethyl ester,
sorbic acid and its potassium salt,
2-propene-1,1-diolacetate,
2-aminobutane,
dodecylguanidine-acetate (dodine), -phthalate,
$\alpha$-chloroacetyl-1,3-aminopropionitrile,
$\alpha$-bromoacetylvalinamide,
1,2-dichloro-1-(methylsulphonyl)-ethylene,
-(methylsulphonl)-ethylene,
1,2-dichloro-1-(butylsulphonyl)-ethylene,
trans-1,2-bis-(n-propylsulphonyl)-ethylene,
benzene derivatives, for example,
para-dichlorobenzene,
hectachlorobenzene (HCB),
1,2,4,5-tetrachloro-4-nitrobenzene (tecnazene),
pentachloro-nitrobenzene (quintozene),
1,3,5-trichloro-2,4,6-trinitrobenzene,
isomer mixture of 1,3,4-trichloro-2,6-dinitrobenzene and 1,2,3-trichloro-4,6-dinitrobenzene,
2,4,5,6-tetrachloroisophthalic acid nitrile,
2,4-dinitrophenyl thiocyanate,
diphenyl (biphenyl),
ortho-nitrodiphenyl,
1-chloro-2,4-dinitronaphthalene,
acenaphthene;
phenols, for example,
2,4,6- and 2,4,5-trichlorophenol,
2,4,5-trichlorophenyl acetate and chloroacetate,
trichlorophenol-zinc salt,
meta-cresyl acetate,
2,3,4,6-tetrachlorophenol,
pentachlorophenol (PCP),
ortho-dihydroxybenzene,
2,4-dihydroxy-n-hexylbenzene,
2-phenylphenol (orthophenylphenol),
3,5-dibromosalicyladehyde,
2-benzyl-4-chlorophenol,
2,2'-dihydroxy-5,5'-dichloro-diphenylmethane (dichlorophene),
2,2'-dihydroxy-3,3',5,5',6,6'-hexachloro-diphenylmethane,
2,2'-dihydroxy-5,5'-dichloro-diphenylsulphide,
2,2'-dihydroxy-3,3',5,5'-tetrachloro-diphenylsulphide and its disodium salt,
4-chloro-ortho-phenylphenol,
1,4-dichloro-2,5-dimethoxybenzene (chloroneb)
salicylanilide,
bismuth salicylate,
trifluoromethyl salicylanilide halogenated with chlorine or bromine,
brominated salicylanilide,
(3,5-dimethyl-4-chlorophenoxy)-ethanol;
dinitrophenol derivatives, for example,
2-(1-methyl-n-propyl)-4,6-dinitrophenyl-2-methylcrotonate (binapacryl),
2-(1-methyl-n-propyl)-4,6-dinitrophenyl isopropylcarbonate (dinobuton),
2-(1-methyl-n-heptyl)-4,6-dinitrophenylcrotonate (dinocap),
methyl-2,6-dinitro-4-(1-ethylhexyl)-phenylcarbonate + methyl-2,6-dinitro-4-(1-propylpentyl)phenylcarbonate (dinocton p),
4-nonyl-2,6-dinitro-phenylbutyrate,
S-methyl-2-(1-methyl-n-heptyl)-4,6-dinitrophenylthiocarbonate;
aniline derivatives, for example,
2,6-dichloro-4-nitroaniline (dichloran),
2-cyanoethyl-N-phenylcarbamate,
propynyl-N-phenylcarbamate,
$\alpha$-(2-bromoacetoxy)-acetanilide;
quinone derivatives, for example,
2,3,5,6-tetrachlorobenzoquinone(1,4) (chloranil),
2,3-dichloro-naphthoquinone(1,4) (dichlone),
2-amino-3-chloro-naphthoquinone(1,4),
2-chloro-3-acetamino-naphthoquinone(1,4),
4-methyl-2,3,5,10-tetrahydro-3,5,10-trioxo-4H4-H-naphtho-(2,3-b)-1,4-thiazine,
2,3,6,7-tetrachloro-4a,8a-epoxy-1,2,3,4,4a,8a-hexahydro-1,4-methanonaphthalene-5,8-dione,
quinoximbenzoyl hydrazone (benquinox);
trichloromethylthio derivatives, for example,
N-(trichloromethylthio)phthalimide (folpet),
N-(trichloromethylthio)cyclohex-4-ene-1,2-dicarboximide (captan),
N-(1,1,2,2-tetrachloroethylthio)-cyclohex-4-ene-1,2-dicarboximide (captafol),
N-methanesulphonyl-N-trichloromethylthio-para-chloraniline,
N'-dichlorofluoromethylthio-NN-dimethyl-N'-phenylsulphamide (dichlofluanide),
S-(2-pyridyl-1-oxide)-S'-trichloromethyl disulphide hydrochloride;
organic phosphates, for example,
0,0,0-trimethylthio phosphate,
0,0-diethyl-phthalimido phosphono thioate,
5-amino-bis-(dimethylamido)phosphinyl-3-phenyl-1,2,4-triazole (triamiphos),
5-methylamino-bis-(dimethylamido)phosphinyl-3-phenyl-1,2,4-triazole,
0,0-diethyl-0-2-pyrazinyl-phosphorus thioate,
0-ethyl-S,S-diphenyl-dithiolphosphate,
0-ethyl-S-benzylphenyl dithiophosphonate,
0,0-diethyl-S-benzyl thiolphosphate;
dithiocarbamates, for example,
zinc salt of dithiocarbazinic acid,
sodium-N-methyl-dithiocarbamate (metham),
sodium-N-methoxyethyl-dithiocarbamate,
sodium-N,N-dimethyl-dithiocarbamate (LDC),
ammonium-N,N-dimethyl-dithiocarbamate,
zinc-N,N-dimethyl-dithiocarbamate (ziram),
iron-N-N-dimethyl-dithiocarbamate (ferbam),
copper-N,N-dimethyl-dithiocarbamate,
disodium-ethylene-1,2-bis-dithiocarbamate (nabam),
zinc-ethylene-1,2-bis-dithiocarbamate (zineb), iron-ethylene-1,2-bis-dithiocarbamate,
manganese-II-ethylene-1,2-bis-dithiocarbamate (maneb),
calcium-ethylene-1,2-bis-dithiocarbamate,
ammonium-ethylene-1,2-bis-dithiocarbamate,
zinc propylene-1,2-bis-dithiocarbamate (mezineb) (propineb),
bis(dimethylthiocarbamyl)ethylene-1,2-bis-dithiocarbamate complex consisting of (Maneb) and zinc salt (mancozeb) tetraethyl thiuram monosulphide,
bis-(N,N-dimethyldithiocarbamyl-mercapto)-methylarsine,
tetramethyl thiuram disulphide (thiram).
dipyrrolidyl thiuram disulphide,
N,N'-bis-(dimethylamino) thiuram disulphide,
polyethylene thiuram sulphide,
complex consisting of (zineb) and polyethylene thiuram disulphide (metiram);
0-heterocyclic compounds, for example
bis-(3,4-dichloro-2(5)-furanoyl) ether (mucochloric anhydride),
2-methoxymethyl-5-nitrofuran,
5-nitro-furfuraldoxime-(2),
5-nitro-furfuryl-amidoxime-(2),
1-oxy-3-acetyl-6-methyl-cyclohexene-(5)dione-(2,4) (dehydroacetic acid);
1-N-heterocyclic compounds, for example,
3-[2-(3,5-dimethyl-2-oxycyclohexyl)-2-hydroxyethyl]-glutarimide (cycloheximide),
phthalimide,
pyridine-2-thiol-1-oxide and 1-hydroxypyridine-2-thione,
zinc salt of pyridine-2-thiol-1-oxide,
manganous salt of pyridine-2-thiol-1-oxide,
S-1(1-oxido-2-pyridyl)isothiuronium chloride,
α,α-bis(4-chlorophenyl)-3-pyridinemethanol (parinol),
8-hydroxyquinoline (8-quinolinol),
8-hydroxyquinoline sulphate (quinosol),
benzoyl-8-hydroxyquinoline salicylate,
3-(2-methylpiperidino)propyl-3,4-dichlorobenzoate,
6-ethoxy-1,2-dihydro-2,2,4-trimethylquinoline (ethoxyquin),
N-lauryl isoquinolinium bromide,
9-(para-n-hexyloxyphenyl)-10-methyl acridinium chloride,
9-(para-n-hexyloxyphenyl)-10-methyl acridinium-para-toluene-sulphonate;
2- and 3-N-heterocyclic compounds, for example,
2-n-heptadecyl imidazolidine acetate (glyodine),
1-hydroxyethyl-2-heptadecyl imidazolidine,
1-phenyl-3,5-dimethyl-4-nitrosopyrazole,
1-para-chlorophenyl-3,5-dimethyl-4-nitrosopyrazole,
1-para-sulphamylphenyl-3,5-dimethyl-4-nitrosopyrazole,
N-(1-phenyl-2-nitropropyl)piperazine,
2-dimethylamino-6-methyl-5-n-butyl-4-hydroxypyrimidine,
N-dodecyl-1,4,5,6-tetrahydropyrimidine,
N-dodecyl-2-methyl-1,4,5,6-tetrahydropyrimidine,
2-n-heptadecyl-tetrahydropyrimidine,
1-(4-amino-4-propyl-5-pyrimidylmethyl)-2-methyl pyridinium chloride hydrochloride,
2-(2'-furyl)-benzimidazole (furidazole),
3-dodecyl-1-methyl-2-phenyl benzimidazolium ferric cyanide,
methyl-N-benzimidazol-2-yl-N-(butylcarbamoyl)carbamate (benomyl),
2-(ortho-chloranilino)-4,6-dichloro-sym.triazine,
2-ethylamino-6-methyl-5-n-butyl-4-hydroxypyrimidine;
S-heterocyclic compounds, for example,
5-chloro-4-phenyl-1,2-dithiol-3-one,
2,3-dicyano-1,4-dithia-anthraquinone (dithianon),
2-(4-thiazolyl-benzimidazole;
NO-, NS- and OS-heterocyclic compounds, for example,
4-(2-chlorophenylhydrazono)-3-methyl-5-isoxazolone (drazoxolon),
thiazolidinone-4-thione-(2) (Rhodanine),
3-(para-chlorophenyl)-5-methylrhodanine,
3,5-dimethyltetrahydro-1,3,5-thiadiazine-2-thione (dazomet),
3,3'-ethylene-bis-(tetrahydro-4,6-dimethyl)-2H-1,3,5-thia-diazine-2-thione) (milneb),
3-benzylideneamino-4-phenylthiazoline-2-thione,
6-chlorobenzthiazole-2-thiol, zinc salt,
6-β-diethylamino-ethoxy-2-dimethylamino-benxthiazole-dihydrochloride,
monoethanolammonium-benzthiazole-2-thiol,
laurylpyridinum-5-chloro-2-mercaptobenzthiazole,
zinc and sodium salts of 2-mercaptobenzthiazole and dimethyldithiocarbamate,
6-(β-diethylaminoethoxy)-2-dimethylamino-benzthiazole dihydrochloride,
3-trichloromethyl-thiobenzothiazolone,
3-trichloromethyl-thiobenzoxazolone,
3-trichloromethyl)-5-ethoxy-1,2,4-thiadiazole,
6-methyl-2-oxo-1,3-dithio[4,5-b]-quinoxaline (quinomethionate),
2-thio-1,3-dithiolo[4,5-b]quinoxaline (thioquinox),
2,3-dihydro-5-carboxanilido-6-methyl-1,4-oxathine,
3,3,4,4-tetrachloro-tetrahydrothiophene-1,1-dioxide,
2,3-dihydro-5-carboxanilido-6-methyl-1,4-oxathine-4,4-dioxide;
quaternary ammonium compounds, for example,
cetyl trimethyl ammonium bromide,
n-alkyl-($C_{12}$,$C_{14}$,$C_{16}$)dimethyl benzyl ammonium chloride,
alkenyl dimethylethyl ammonium bromide,
dialkyl dimethyl ammonium bromide,
alkyl dimethyl benzyl ammonium chloride,
alkyl $C_9$-$C_{15}$-tolylmethyl trimethyl ammonium chloride,
di-isobutyl cresoxyethoxyethyl dimethylbenzyl ammonium chloride,
para-di-isobutyl phenoxyethoxyethyl dimethyl benzyl ammonium chloride,
benzoyltrimethyl ammonium bromide;
fungicidal antibiotics, for example,
gliotoxin,
2,4-diguanidino-3,5,6-trihydroxycyclohexyl-5-deoxy-2-0-(2-deoxy-2-methylamino-α-L-glycopyranosyl)3-C-formyl-β-L-lyxopentanofuranoside (streptomycin),
7-chloro-4,6-dimethoxycoumaran-3-one-2-spiro-1'-(2'-methoxy-6'-methylcyclohex-2'-en-4'-one) (griseofulvin),
4-dimethylamino-1,4,4α,5,5α6,11,12α-octahydro-3,5,6,10,12,12α-hexahydroxy-6-methyl-1,11-dioxo-2-naphthacene carboximide (oxytetracyclin), 7-chloro-4-dimethylamino-1,4,4α-5,5α,6,11,12α-octahydro-3,6,10,12,12α-pentahydroxy-6-methyl-1,11-dioxo-2-naphthacene carboximide (chlortetracyclin),
(pimaricin),
(lancomycin), (phleomycin), (kasugamycin), (phytoactin),
di(-)-threo-2,2-dichloro-N-[β-hydroxy-α-(hydroxymethyl)-para-nitrophene-ethyl]acetamide (chloramphenicol),
blasticidine-S-benzylamino-benzenesulphonate;
N-(3-nitrophenyl)itaconimide,
phenoxyacetic acid,
sodium-para-dimethylamino-benzenediazosulphonate,
acrolein-phenylhydrazone,
2-chloroacetaldehyde(2,4-dinitrophenyl)-hydrazone,
2-chloro-3-(tolysulphonyl)-propionitrile,
1-chloro-2-phenyl-pentane-diol(4,5)-thione(3),
para-nonyl-phenoxy polyethyleneoxyethanol-iodine complex,
(α-nitromethyl)-ortho-chlorobenzyl thioethylamine hydrochloride,
3-(para-tertiary butyl-phenylsulphonyl)acrylonitrile,
octachloro-cyclohexenone,
pentachloro-benzyl alcohol,
pentachloro-benzyl acetate,
pentachloro-benzaldehyde cyanohydrin,
2-nor-camphan methanol,
2,6-bis-](dimethylaminomethyl)-cyclohexanone,
decachloro-octahydro-1,3,4-metheno-2H-cyclobuta[cd]-pentalen-2-one,
1-(3-chlorallyl)-3,5,7-triaza-1-azonia-adamantan chloride, coal tar and blast furnace tar;
and mixtures of
nickel sulphate + maneb,
maneb + mercaptobenzthiazole,
zineb + mercaptobenzthiazole,
zineb + nickel-II-chloride,
zineb + nickel-II-sulphate,
ziram + basic copper sulphate,
ziram + zinc mercaptobenzthiazole,
thiram + cadmium chloride hydrate,
thiram + hydroxymercuric chlorophenol,
thiram + phenylmercuric acetate,
polyethylene-bis-thiuram sulphide + copper oxychloride,
methylarsine-bis(dimethyl-dithiocarbamate) + ziram + thiram,
folpet + phenylmercuric acetate,
dodine + ferbam + sulphur,
dithianone + copper oxychloride,
dichlone + ferbam + sulphur,
dinocap + dinitro-octylphenol,
captan + quintozene + tribasic copper sulphate,
cadmium propionate + phenylmercuric propionate,
formaldehyde + urea,
phenyl ammonium cadmium dilactate + phenylmercuric formamide,
and basic copper sulphate + zinc salts.

The following Examples illustrate the invention, the parts and percentages being by weight, unless otherwise stated.

EXAMPLE 1

42 parts of triethylamine were dropped at 5° to 15°C into a mixture of 26.6 parts of methanephosphonic acid dichloride and 49.6 parts of benzylmercaptan in 500 parts by volume of anhydrous benzene. The mixture was stirred overnight at room temperature. The hydrochloride was then washed out twice with 100 parts of water and the organic phase extracted with 50 parts by volume each of N-sodium hydroxide solution and water. The residue obtained after evaporation of the solvent consisted of 52.3 parts of the compound of the formula

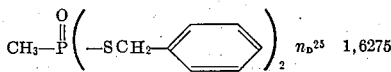

Compound No. 1

In an analogous manner it is possible to manufacture the compound of the formula

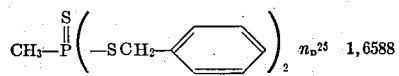

Compound No. 2 as well as the following compounds:

| Compound number | Formula | Physical characteristic |
|---|---|---|
| 3 | Cl—CH₂—P(=S)(S—CH₂—C₆H₅)₂ | $n_D^{23}$ 1.6648 |
| 4 | Cl₃C—P(=O)(S—CH₂—C₆H₅)₂ | $n_D^{23}$ 1.7023 |
| 5 | Cl—CH₂—P(=O)(S—CH₂—C₆H₅)₂ | $n_D^{23}$ 1.6932 |
| 6 | CH₃—P(=O)(SCH₂—C₆H₄—Cl)₂ | $n_D^{23}$ 1.6311 |
| 7 | isoC₃H₇—P(=O)(SCH₂—C₆H₅)₂ | $n_D^{23}$ 1.6105 |
| 8 | C₂H₅—P(=O)(SCH₂—C₆H₅)(SCH₂—C₆H₄—NO₂) | $n_D^{23}$ 1.6259 |
| 9 | C₂H₅—P(=O)(SCH₂—C₆H₅)(SCH₂—C₆H₄—CF₃) | $n_D^{23}$ 1.5488 |
| 10 | C₂H₅—P(=O)(SCH₂—C₆H₅)(SCH₂—C₆H₃Cl₂) | $n_D^{23}$ 1.6175 |
| 11 | CH₃—P(=O)(SCH₂—C₆H₃Cl₂)₂ | $n_D^{24}$ 1.6423 |
| 12 | CH₃—P(=O)(SCH₂—C₆H₃Cl₂)₂ | $n_D^{24}$ 1.6388 |
| 13 | CH₃—P(=O)(SCH₂—C₆H₄—CN)₂ | $n_D^{24}$ 1.6367 |

Continued

| Compound number | Formula | Physical characteristic |
|---|---|---|
| 14 | CH$_3$—P(O)(SCH$_2$—C$_6$H$_4$—CH$_3$)$_2$ | $n_D^{24}$ 1.6099 |
| 15 | C$_6$H$_5$—CH$_2$—P(O)(SCH$_2$—C$_6$H$_5$)$_2$ | Smp.: 85–90° |
| 16 | C$_6$H$_5$—CH$_2$—P(O)(SCH$_2$—C$_6$H$_4$—Cl)$_2$ | $n_D^{23}$ 1.6375 |
| 17 | C$_2$H$_5$—P(O)(SCH$_2$—C$_6$H$_5$)$_2$ | $n_D^{23}$ 1.6169 |
| 18 | C$_2$H$_5$—P(O)(SCH$_2$—C$_6$H$_4$—Cl)$_2$ | $n_D^{23}$ 1.6249 |
| 19 | Cl—CH$_2$—CH$_2$—P(O)(SCH$_2$—C$_6$H$_5$)$_2$ | $n_D^{24}$ 1.6193 |
| 20 | Cl—CH$_2$—CH$_2$—P(O)(SCH$_2$—C$_6$H$_4$—Cl)$_2$ | $n_D^{23}$ 1.6282 |
| 21 | CH$_3$—P(O)(SCH$_2$—C$_6$H$_4$—CH$_3$)$_2$ | $n_D^{24}$ 1.6099 |

EXAMPLE 2

40 parts of a compound of the general formula I were taken up in a 25% xylene solution of a mixture of equal parts of a condensation product of about 1 mole of para-tertiary octylphenol and about 10 moles of ethylene oxide and calcium para-dodecyl-benzenesulphonate and the mixture made up with xylene to 100 parts by volume. When this solution is diluted with water to the desired concentration, a stable emulsion is obtained which is very suitable for spraying.

EXAMPLE 3

Compounds Nos. 1 and 7 specified in Example 1 are distinguished by their activity against *Piricularia oryzae* Bri. et Cav., the pathogen which causes the rice blast disease. Rice plants were grown in a greenhouse and infested with an aqueous conidia suspension of the tested fungus. The plants were incubated in a moist chamber and on the day after the infection sprayed with an aqueous broth containing 0.1% of the active substance under test.

After one week the treated plants displayed an infestation of 5%, compared with a 100% infestation of the controls.

Compound No. 7 achieved this result even in a concentration of 0.03% of active substance.

I claim:

1. The compound of the formula

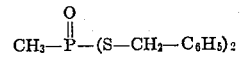

2. The compound of the formula

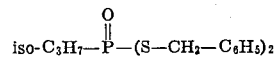

* * * * *